United States Patent
Winterot (10) Patent No.: US 7,715,021 B2
(45) Date of Patent: May 11, 2010

(54) MICROSCOPE AND MICROSCOPE MICROEXAMINATION PROCEDURE METHOD FOR THE MEASUREMENT OF THE SURFACE PROFILE OF AN OBJECT

(75) Inventor: Johannes Winterot, Jena (DE)

(73) Assignee: Carl Zeiss Microimaging GmbH, Jena (DE)

( * ) Notice: Subject to any disclaimer, the term of this patent is extended or adjusted under 35 U.S.C. 154(b) by 60 days.

(21) Appl. No.: 12/226,634

(22) PCT Filed: Apr. 17, 2007

(86) PCT No.: PCT/EP2007/003350

§ 371 (c)(1),
(2), (4) Date: Oct. 23, 2008

(87) PCT Pub. No.: WO2007/124858

PCT Pub. Date: Nov. 8, 2007

(65) Prior Publication Data

US 2009/0109447 A1 Apr. 30, 2009

(30) Foreign Application Priority Data

Apr. 26, 2006 (DE) .................. 10 2006 019 384

(51) Int. Cl.
*G01B 11/24* (2006.01)
(52) U.S. Cl. .................... 356/607; 356/608
(58) Field of Classification Search ............... 356/607, 356/608; 250/559.22
See application file for complete search history.

(56) References Cited

U.S. PATENT DOCUMENTS 4,748,335 A * 5/1988 Lindow et al. ......... 250/559.22
6,038,066 A 3/2000 Baumann
6,188,514 B1 * 2/2001 Saito et al. ............... 359/381

(Continued)

FOREIGN PATENT DOCUMENTS

DE 44 19 940 12/1995

(Continued)

OTHER PUBLICATIONS

XP 000611036—Optical Engineering, Feb. 1998, vol. 27, No. 2, pp. 135-142, Franco Querciolo, et al., "Optical Surface Profile Transducer".

Primary Examiner—Roy Punnoose
(74) Attorney, Agent, or Firm—Frommer Lawrence & Haug LLP (57) ABSTRACT

The invention provides a microscope for measuring the surface profile of an object, including (1) an illumination module which directs illumination radiation with different wavelengths to different surface portions of the object in such a way that a predetermined object intersection length range is illuminated for every portion, and (2) a detection module which detects sample radiation of every portion successively in time. Wherein the detection module directs the sample radiation into a detection beam path via a scanner and confocally images another wavelength of the sample radiation in a plane for every intersection length to be detected. The detection module also detects the intensity of the confocally imaged sample radiation in a wavelength-dependent manner and derives therefrom the position of the corresponding surface portion of the object. Wherein the detection module has a color module arranged between the scanner and the plane, through which the sample radiation passes.

17 Claims, 5 Drawing Sheets

U.S. PATENT DOCUMENTS

| | | |
|---|---|---|
| 6,674,572 B1 | 1/2004 | Scheruebl et al. |
| 7,411,730 B2 * | 8/2008 | Winterot .................... 359/385 |
| 2004/0109170 A1 * | 6/2004 | Schick ...................... 356/614 |

FOREIGN PATENT DOCUMENTS

| | | |
|---|---|---|
| DE | 196 12 846 | 10/1997 |
| DE | 197 13 362 | 10/1998 |
| DE | 102 42 374 | 4/2004 |
| DE | 10 2004 052 276 | 5/2006 |
| FR | 2 826 461 | 12/2002 |
| WO | 95/00871 | 1/1995 |

* cited by examiner

MICROSCOPE AND MICROSCOPE MICROEXAMINATION PROCEDURE METHOD FOR THE MEASUREMENT OF THE SURFACE PROFILE OF AN OBJECT

The present application claims priority from PCT Patent Application No. PCT/EP2007/003350 filed on Apr. 17, 2007, which claims priority from German Patent Application No. DE 10 2006 019 384.9 filed on Apr. 26, 2006, the disclosure of which is incorporated herein by reference in its entirety.

BACKGROUND OF THE INVENTION

1. Field of the Invention

The invention is directed to a microscope and to a microscopy method for measuring the surface profile of an object. The measurement of the surface profile can be carried out conventionally, e.g., by a laser scanning microscope, by executing and evaluating a sequence of confocal slices (Z-stack). The rate of image acquisition and the quantity of Z-slices determines the detectable topological dynamic.

2. Description of Related Art

DE 44 19 940 A1 discloses the use of an objective lens with a strong chromatic aberration in a confocal optical microscope and the spectral splitting and analysis of the confocally detected light so that different depths of the object can be acquired simultaneously. The disadvantage consists in that a special objective lens must be provided and standard objective lenses cannot be used.

SUMMARY OF THE INVENTION

On this basis, it is the object of the invention to provide a microscope for measuring the surface profile of an object which can be realized in a simple and economical manner and which can rapidly acquire the surface profile. Further, a corresponding microscopy method is provided.

According to the invention, this object is met by a microscope for measuring the surface profile of an object, with an illumination module which directs an illumination beam with different wavelengths to different surface portions of the object in such a way that a predetermined object intersection length range is illuminated for every portion and, based on an interaction between the illumination beam and the object, sample radiation is generated, and with a detection module which detects sample radiation of every portion successively in time in that it directs the sample radiation into a detection beam path by means of a scanner and confocally images another wavelength of the sample radiation directed into the detection beam path in a plane for every intersection length of the object intersection length range to be detected, detects the intensity of the confocally imaged sample radiation in a wavelength-dependent manner and derives therefrom the position of the corresponding surface portion of the object, wherein the detection module has a color module with adjustable longitudinal chromatic aberration (preferably a continuously adjustable longitudinal chromatic aberration) which is arranged between the scanner and the plane and through which the sample radiation passes so that the intersection lengths to be detected are adjustable by changing the longitudinal chromatic aberration.

The microscope according to the invention has the advantage, on the one hand, that it is possible to adapt to the topology of the object easily and quickly by changing the longitudinal chromatic aberration. On the other hand, the color module is arranged between the scanner and the plane so that the color module can be integrated in a conventional microscope or laser scanning microscope to arrive at the microscope according to the invention. In particular, it is not necessary to change the objective lens of the microscope or to replace it with a specially prepared objective lens provided with longitudinal chromatic aberration.

In the microscope, the sample radiation can impinge on the color module as a diverging or parallel beam bundle and is then transformed by the color module into a parallel or converging beam bundle.

Further, the color module can have at least one lens and a curved mirror which folds the detection beam path in such a way that the sample radiation passes through the lens twice. In this way, a color module is provided which is constructed of very few elements and which has the desired longitudinal chromatic aberration. In particular, the lens and the curved mirror can form first color optics and the color module can additionally have second exchangeable color optics having a different longitudinal chromatic aberration than the first color optics. The second exchangeable color optics can also be formed in particular as a lens with a curved mirror.

The mirror can be constructed as a rear-surface mirror on one side of the lens. This provides an extremely compact structural component and advantageously prevents contamination of the mirror.

The color module can have the lens as an individual lens and the mirror as an individual mirror. In particular, both sides of the lens can be formed as spherical surfaces so that production can be carried out easily with the desired accuracy as well as economically.

In particular, the color module can be arranged in such a way that the principal ray of the sample radiation coincides with the optical axis of the color module.

Further, a deflection mirror with a through-hole can be arranged in front of the color module in the detection beam path, and the sample radiation passes through the through-hole as a diverging beam bundle, impinges on the color module and, coming from the color module as a parallel bundle, is deflected at the deflection mirror. In this case, the color module and the deflection mirror can be arranged in an area of the detection beam path in which the sample radiation propagates as a parallel beam bundle, wherein a collimator is provided in addition. The deflection mirror, collimator and color module can be arranged in such a way that the parallel sample radiation bundle is reflected as a parallel bundle from the deflection mirror to the collimator which reflects the sample radiation bundle back to the deflection mirror as a converging beam bundle in such a way that it passes through the through-hole of the deflection mirror and propagates behind the through-hole as a diverging beam bundle. This diverging beam bundle then impinges on the color module which reflects the diverging beam bundle back to the deflection mirror as a parallel bundle which is deflected at the deflection mirror to the next optical element in the detection beam path as a parallel bundle.

It is also possible that the sample radiation impinges on the deflection mirror as a parallel beam bundle, is deflected by the deflection mirror to the color module, passes through the color module and, coming from the color module as a converging beam bundle, passes through the through-hole. In particular, in this case the deflection mirror can also be used simultaneously as a confocal diaphragm which increases the compactness of the microscope. In this case too, a collimator can be arranged additionally, and the arrangement of the color module, deflection mirror and collimator is then selected in such a way that the parallel sample radiation bundle is reflected at the deflection mirror toward the color module. The parallel beam bundle is reflected back by the color module as a converging beam bundle to the through-hole of the deflection mirror, the passed converging sample radiation bundle strikes the collimator after the through-hole as a diverging beam bundle and is reflected back by the collimator to the deflection mirror as a parallel sample radiation bundle, and the deflection mirror deflects the parallel sample radiation bundle to the next optical element in the detection beam path. In the described embodiments in which the collimator is provided, the deflection mirror is preferably silvered on both sides.

A main splitter can be arranged in the microscope in the detection beam path, the illumination beam is guided to the object by this main splitter and the sample radiation is guided in the detection beam path, the color module being arranged between the main splitter and the plane. Accordingly, in this construction, the color module is provided only in the detection beam path and is not traversed by the illumination beam with different wavelengths for illuminating the object.

It is also possible to arrange the color module between the scanner and the main splitter. In this case, the color module is also traversed by the illumination beam for illumination so that the different wavelengths are also focused in the corresponding intersection lengths at the same time in this way. In this construction, it is preferable when the collimator described above in connection with the deflection mirror is also provided because the color module is arranged in the parallel beam path between the main splitter and the scanner and, therefore, with the collimator arranged as described above, it is easily possible to impress the respective desired longitudinal chromatic aberration on the parallel beam bundle (the illumination beam for illumination as well as the sample radiation).

The color module can comprise the mirror and (e.g., exactly) two or (e.g., exactly) three lenses, and the lenses and the mirror can be displaceable along the optical axis of the color module so that the desired longitudinal chromatic aberration of the color module can be adjusted. In particular, this makes it possible to change the longitudinal chromatic aberration continuously and to adapt it continuously to the desired surface intersection length ranges.

All of the lenses can be produced from the same material, which reduces production costs.

In the microscope according to the invention, a confocal illumination can be carried out by the illumination module. But it is also possible to realize the object illumination with incident brightfield illumination or transmitted brightfield illumination. In this case, only detection is carried out confocally.

Further, the illumination module can also contain the source for generating the illumination beam with different wavelengths. The illumination beam is preferably illumination light with wavelengths ranging from 300 nm to 700 nm. Naturally, other wavelengths are also possible. In particular, the illumination beam is laser radiation.

Further, the microscope can have a control unit which controls the operation of the microscope and particularly also the detection.

A spectral splitting of the confocally formed sample radiation can be carried out for wavelength-dependent detection. For this purpose, suitable dispersive optical elements can be used, e.g., a prism and/or grating.

Further, the microscope can have a display unit such as, e.g. a screen, on which the measured surface profile is displayed. The display can be carried out by means of a false color display or as a three-dimensional display.

The detection module can have, in the plane, a confocal diaphragm which transmits or reflects only the confocally imaged sample radiation. In particular, the confocal diaphragm can be formed as a pinhole diaphragm.

The interaction between the illumination beam and the object may be reflection or transmission, for example. It is also possible that fluorescence radiation is generated and detected.

The above-stated object is met further by a microscopy method for measuring the surface profile of an object in which the illumination beam with different wavelengths is directed onto the different surface portions of the object in such a way that a predetermined object intersection length range is illuminated for every portion and, based on an interaction between the illumination beam and the object, sample radiation is generated and sample radiation of every portion is detected successively in time in that the sample radiation is directed into a detection beam path by means of a scanner and another wavelength of the sample radiation directed into the detection beam path is imaged confocally in a plane for every intersection length of the object intersection length range to be detected, the intensity of the confocally imaged sample radiation is detected in a wavelength-dependent manner and the position of the corresponding portion of the object is derived from the latter, and a color module with adjustable longitudinal chromatic aberration is arranged between the scanner and the plane and is traversed by the sample radiation so that the intersection lengths to be detected can be adjusted by changing the longitudinal chromatic aberration.

This method makes it possible to acquire the surface profile of a sample economically and quickly.

The illumination beam is preferably illumination light with wavelengths ranging from 300 nm to 700 nm, although other wavelengths are also possible. The illumination beam can also be laser radiation.

The microscopy method can be further developed in the same way as the microscope according to the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
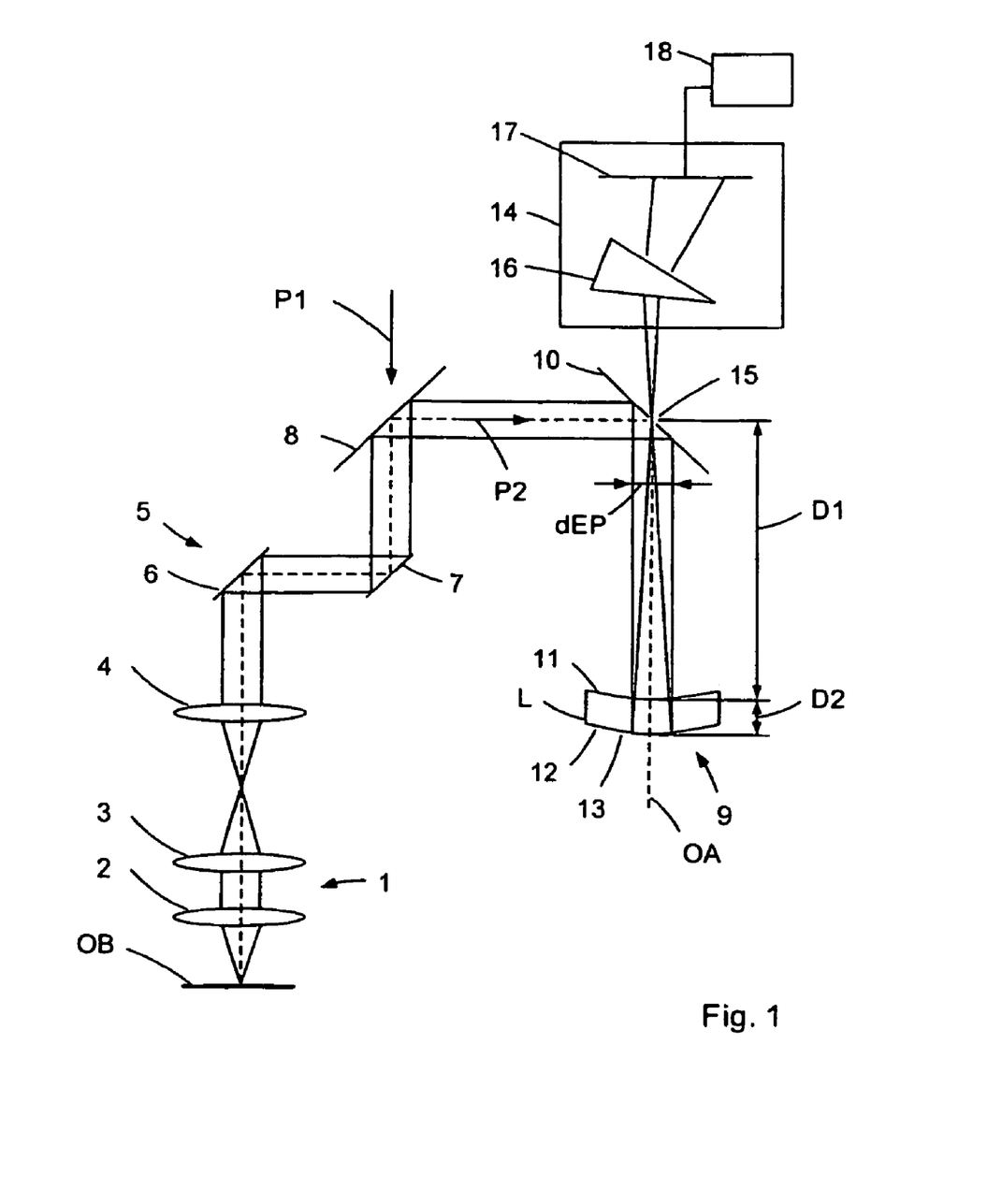
FIG. 1 is a schematic view of an embodiment form of the microscope according to the invention.

In the embodiment form of the microscope for measuring the surface profile of an object OB shown in FIG. 1, essentially only the detection channel is shown in detail.

The microscope is constructed as a laser scanning microscope and comprises microscope optics 1 for detection which have an objective 2 and a tube lens 3, scanner optics 4, a deflecting unit and scanner 5 with two mirrors 6, 7, a main splitter 8 and a deflection mirror 10 and a color module 9 containing an individual lens L.

The individual lens L is constructed as a concavo-convex lens L, where the concave side 11 faces the deflection mirror 10 and the convex side 12 is silvered so that the individual lens L has a rear-surface mirror 13.

Further, a detection unit 14 is arranged in such a way that the deflection mirror 10 lies between the detection unit 14 and the individual lens L.

In operation, laser radiation with different wavelengths is guided by the main splitter 8 (as is indicated by arrow P1) to the scanner 5 and is focussed on or in an object OB to be examined and moved over the object by the scanner 5 and the scanner optics 4 in combination with the microscope optics 1. Based on an interaction between the focused laser radiation and the object OB (e.g., reflection at the object surface), a sample radiation is generated which is directed by the microscope optics 1, the scanner optics 4 and the scanner 5 into the descanned beam path behind the scanner 5. The sample radiation is then reflected to the deflection mirror 10 (arrow P2) in the descanned beam path (also called the detection beam path in this case) by the main splitter 8 and is directed to the individual lens L by the deflection mirror 10 as a parallel beam bundle.

The individual lens L has a predetermined longitudinal chromatic aberration so that, depending on the object intersection length from which the sample radiation originates, a different wavelength is focused confocally in a through-opening 15 provided in the deflection mirror 10. Accordingly, the deflection mirror 10 also serves in this case as a confocal diaphragm for detection at the same time The detection unit 14 which detects the intensity of the confocally imaged sample radiation in a wavelength-dependent manner is arranged downstream of the deflection mirror 10. The detection unit 14 can have a prism 16, as is shown schematically in FIG. 1, for wavelength-dependent deflection and a detector 17 arranged downstream of the prism 16. The detection signals of the detector 17 are fed to a control unit 18 which can determine the position of the surface of the portion of the object OB that has just been detected depending on the intensity. This can be displayed to a user, e.g., as a false color image in which every displayed color corresponds to a different height. However, a three-dimensional display is also possible.

Based on the wavelength-dependent confocal imaging in the through-opening 15, an object intersection length and, therefore, a height of the corresponding sample surface, can be associated with every wavelength. In this connection, a section (x-z section) through a portion of the object OB is shown schematically in FIG. 2. The surface of the object OB is measured at a first point x1 and at a second point x2 with the laser scanning microscope from FIG. 1. The microscope is adjusted in such a way that the laser radiation with the different wavelengths is focused at a height $z_0$. Naturally, the sample is also illuminated by the laser radiation above and below this focus height $z_0$, albeit with a somewhat poorer focusing depending on the depth of focus. Accordingly, e.g., height range $z_{min}$ to $z_{max}$ (that is, a predetermined object intersection length range) is illuminated by the laser radiation with different wavelength (indicated in FIG. 2 by dashed lines).

Figure 2:
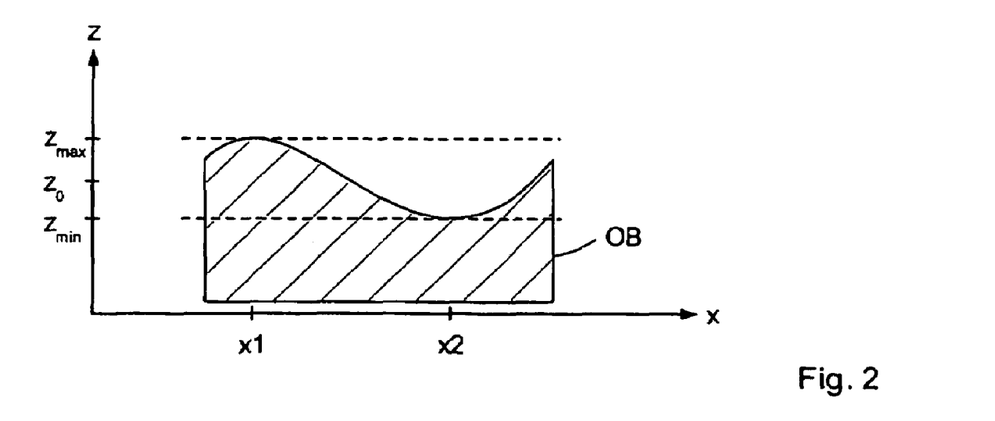
FIG. 2 is an enlarged cross-sectional view through a portion of the object to be measured.

Based on the longitudinal chromatic aberration of the individual lens L, different wavelengths are imaged confocally in the through-opening 15 from the height range from $z_{min}$ to $z_{max}$ depending on the height and, therefore, depending on the intersection length so that, e.g., the confocally imaged red wavelength corresponds to $z_{min}$ and the confocally imaged blue wavelength corresponds to $z_{max}$. During the detection at location x1, the laser radiation with the different wavelengths is reflected most strongly at the surface located at $z_{max}$ so that the intensity of the blue wavelength at the detector 17 is the greatest. During the detection at location x2, on the other hand, the intensity of the red sample radiation is highest because the surface only has height $z_{min}$ at that location.

The color module 9 has not only an individual lens L, but a plurality of exchangeable individual lenses L which differ from one another only in thickness D2, in the distance D1 of their concave side 11 from the deflection mirror 10, and in the radii of curvature of the front 11 and back 12. Different longitudinal chromatic aberration characteristics can be provided by exchanging the individual lenses L so that, for example, a larger or smaller object intersection length range (from $z_{min}$ to $z_{max}$) can be provided. Accordingly, the color module 9 has a changeable longitudinal chromatic aberration by which the detectable object intersection length range can be adjusted and, e.g., quickly adapted to changing object topologies.

The main splitter 8, scanner 5, scanner optics 4 and microscope optics 1 form an illumination module. The illumination module can also contain the laser source, not shown, for generating the laser radiation. The microscope optics 1, scanner optics 4, scanner 5, main splitter 8, deflection mirror 10, color module 9 and detection unit 14 form a detection module.

Figure 3:
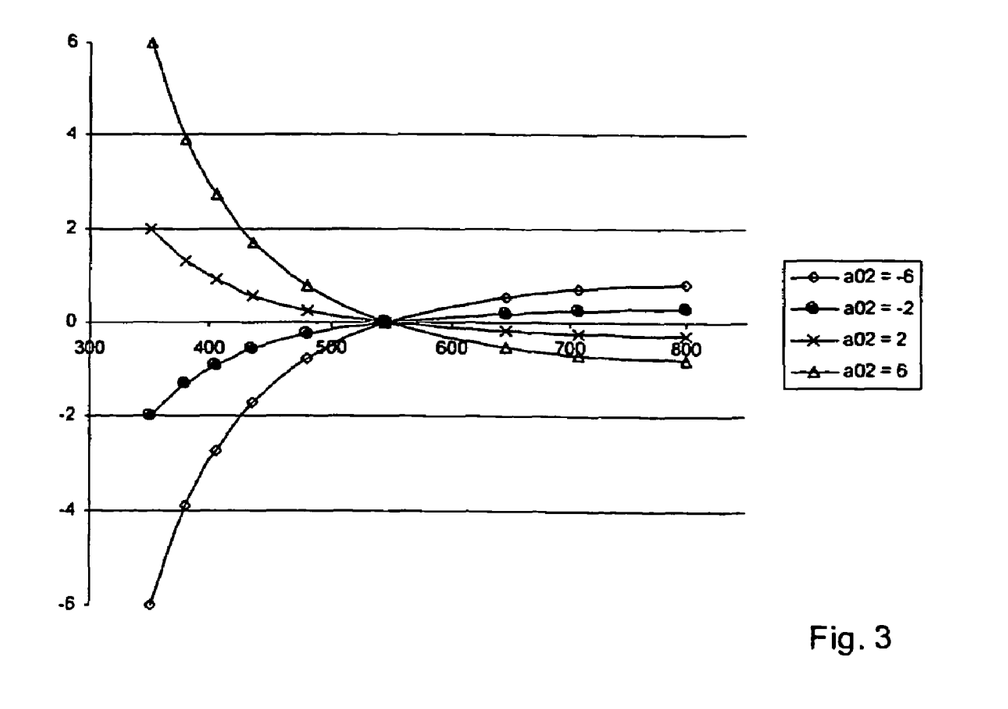
FIG. 3 shows a graph illustrating the longitudinal chromatic aberration of the color module 9 from FIG. 1.

FIG. 3 shows the longitudinal chromatic aberration characteristic for four variants of the color module 9 according to the invention. The wavelength λ is shown in nm along the abscissa and the longitudinal chromatic aberration a02(λ) is shown along the ordinate as wavelength deformation in parts of λ, where the physical intersection length can be calculated by $s(\lambda)=1.1*\lambda*a02(\lambda)/nA^2$. $\Delta s=s(\lambda)-s(546 nm)$ describes an intersection length difference for the wavelength λ and nA is the numerical aperture which is defined in this instance as (½)*(dEP/f) (dEP is the diameter of the entrance pupil; in this instance, dEP=3.2 mm, and f is the focal length of the collimator). The value of a02(λ) for λ=350 nm is designated simply as a02 and serves as a parameter for distinguishing between different longitudinal chromatic aberration characteristics of the color module 9.

The line a02=−2 shows the longitudinal chromatic aberration characteristic of the individual lens L of FIG. 1 which is formed by the following parameters:

radius of curvature of the concave front side 11: 54.13 mm;
radius of curvature of the convex back side 12: 42.34 mm;
thickness D2 of the lens: 3.71 mm;
distance D1 of the front side 11 from the point light source: 17.14 mm;
material parameter: $n_e$=1.58481, $v_e$=40.57; and
focal length f: 20 mm.

FIG. 3 shows the longitudinal chromatic aberration characteristic of modifications of the color module 9 from FIG. 1, but the basic construction as rear-surfaced concavo-convex individual lens is retained and the same lens material is also used. Only the radii of curvature, lens thickness and distance D1 are varied.

The corresponding radii of curvature and distances are indicated in the following table, wherein the focal length f of the collimator 1 of FIG. 1 and that of the modifications according to the following table are 20 mm.

| Curve a02 = | Radius of curvature front 2 [mm] | Radius of curvature back 3 [mm] | D2 [mm] | D1 [mm] |
|---|---|---|---|---|
| −6 | 177.95 | 56.89 | 3.74 | 17.66 |
| 0 | 40.21 | 42.34 | 3.71 | 17.74 |
| +2 | 31.98 | 39.31 | 4.00 | 17.59 |
| +6 | 22.66 | 34.29 | 4.05 | 17.60 |

As can be clearly seen from FIG. 3, the longitudinal chromatic aberration characteristic can accordingly be adjusted from monotonously decreasing with increasing wavelength (a02=6 or 2) to monotonously increasing with increasing wavelength (a02=−6 or −2) only through the selection of the radii of curvature and distances or only by changing the geometric dimensions without altering the material. Accordingly, the desired values can be adjusted for the corresponding application (that is, for the corresponding object intersection length range). The variant a02 (regardless of wavelength) is listed in the table above only for the sake of completeness and can be used when no wavelength-dependent object intersection length, and therefore no simultaneous detection of different object intersection lengths, is desired.

The individual lens L from FIG. 1 and the modifications shown in FIG. 3 all satisfy the following condition:

$$|1/R2 - (a02*(b2/f^2 + b1/f + b0) + c2/f^2 + c1/f + c0)| < 0.0003.$$

In this case, R2 stands for the radius of curvature of the back 12 and f stands for the focal length of the individual lens L; and the constants c0, c1, c2, b0, b1, b2 have the following values:

b0=−0.0010395;
b1=−0.003737;
b2=0.0844626;
c0=0.00068469;
c1=−0.570058; and
c2=1.679172.

R2 and, therefore, the radius of curvature of the mirror 13 can be determined from the above condition. The individual lens L can be designed with different focal lengths. Focal lengths that satisfy the inequality 0.002<1/f<0.1 can be adjusted.

The above condition can be derived from the numerical analysis of the designed individual lens or microscope depending on given boundary conditions (e.g., focal length of the individual lens L or of the color module 9, lens material, etc.).

Further, it is possible in the microscope according to the invention to change the distance D1. This can be carried out in particular in that the color module 9 is moved along the optical axis OA. In the graph of FIG. 3, an increase in the distance D1 causes a displacement of the corresponding curve along the ordinate toward smaller values. In a corresponding manner, a decrease in the distance D1 leads to an upward displacement of the curve.

Of course, it is also possible to form the mirror 13 as a separate mirror. The individual lens L can also have a grating which is formed, for example, on the front side 11, the back side 12 or on the mirror surface 13.

Figure 4:
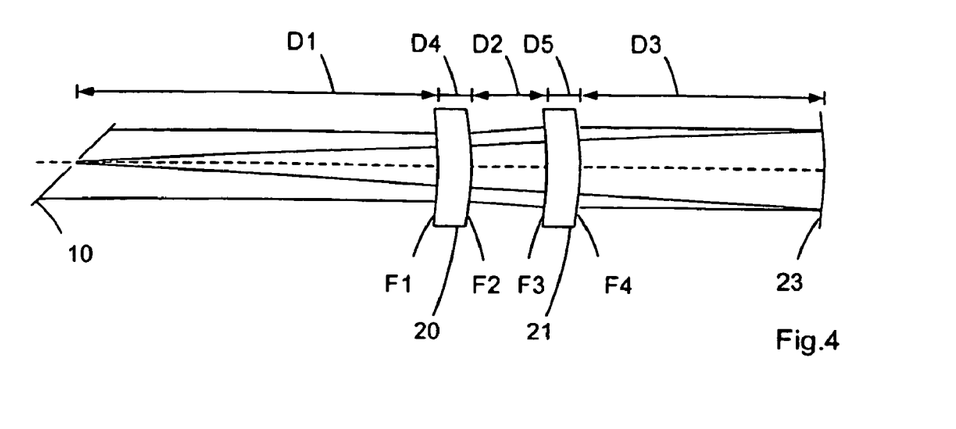
FIG. 4 shows a color module 9 according to a second embodiment form.

FIG. 4 shows another modification of the color module 9. In this embodiment form, the color module 9 comprises two concavo-convex lenses 20, 21 and a concave mirror 23. The lenses 20 and 21 and the mirror 23 are movable along the optical axis so that their distances can be changed. Accordingly, for example, with a constant focal length f of the color module 9 in FIG. 4, the longitudinal chromatic aberration can be tuned from a minimum object intersection length range continuously to a maximum object intersection length range (longitudinal chromatic aberration is greatest or equal to the wavelength difference for excessive height difference compared to the minimum object intersection length range.)

In the embodiment form in FIG. 4, the lenses 20 and 21 are made of the same material and have an Abbe number of 36.16. The distance from the entrance pupil of the color module 9 to the concave side of the lens 20 is D1, the distance between the two sides of the lenses 20 and 21 facing one another is D2, and the distance from the convex side of the lens 21 to the mirror 23 is D3. The thickness of the lenses 20 and 21 is D4 and D5, respectively. The focal length f is 20 mm. For this case, the curvature of the mirror 23, the refractive power of the lenses 20 and 21, and the movement dynamic (that is, the variation in distances D1, D2, and D3) can be described as follows as a function of the focal length of the system, where the focusing and adjustment of the focal length is brought about by the choice of two of the three distances D1, D2, and D3 and the longitudinal chromatic aberration characteristic can be determined by the choice of the quantity of the third distance (in this case D3):

$$|1/R + 0.4088/f + 0.0023| < 0.001;$$

$$|f1 + 0.0669*f + 28.788| < 0.05*f;$$

$$|f2 - 0.0271*f - 57.22| < 0.05*f;$$

$$|D3(\Delta s(=0)) - D3(\Delta s(<0)) - 0.4179*f + 1.4475| < 0.02*f;$$

$$|D3(\Delta s(>0)) - D3(\Delta s(<0)) - 0.731*f - 2.867| < 0.02*f;$$

where R is the radius of curvature of the mirror 23 and f1 and f2 are the focal lengths of the lenses 20 and 21, respectively. $\Delta s(<0)$ stands for a $\Delta s$ whose value is less than 0. $\Delta s(=0)$ stands for a $\Delta s$ whose value is 0, and $\Delta s(>0)$ stands for a $\Delta s$ whose value is greater than 0. In the present embodiment example, a value a02 of about −3.5 is reached for $\Delta s(<0)$ and a value a02 of about +3.5 is achieved for $\Delta s(>0)$.

The exact parameters of the color module 9 from FIG. 4 are:
radius of curvature of the concave surface F1: 13.10;
radius of curvature of the convex surface F2: 48.39;
radius of curvature of the concave surface F3: 18.44;
radius of curvature of the convex surface F4: 12.78;
radius of curvature of the concave mirror 23: 43.99;
D4=2.00; and
D5=2.00.

|  | $\Delta s(<0)$ | $\Delta s(=0)$ | $\Delta s(>0)$ |
|---|---|---|---|
| D1 | 14.05 | 6.93 | 3.12 |
| D2 | 4.83 | 3.12 | 0.55 |
| D3 | 0.50 | 7.68 | 16.57 |

Figure 5:
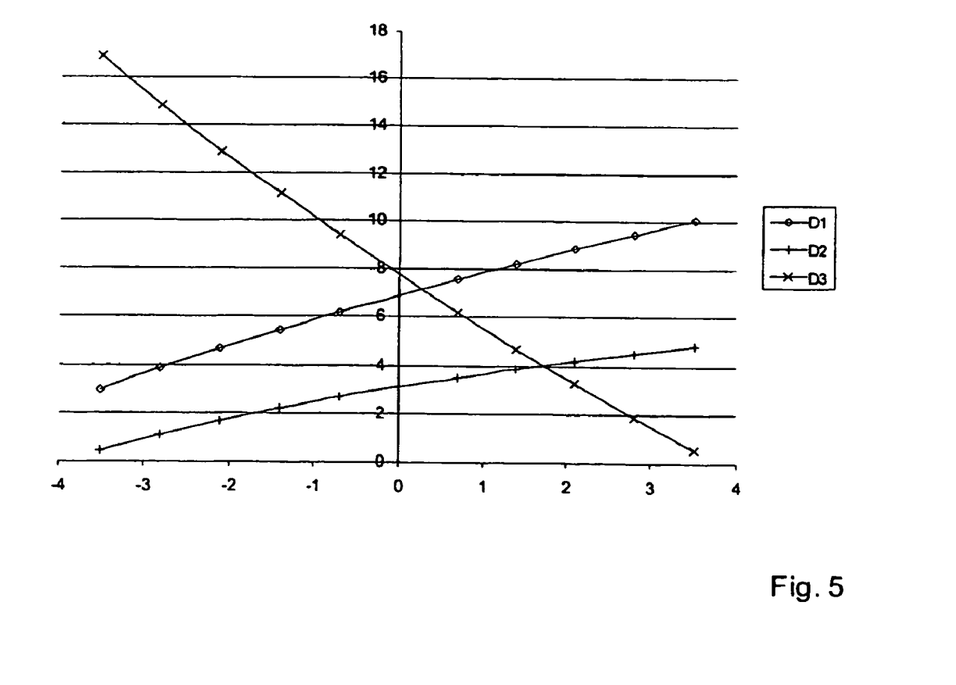
FIG. 5 is a graph showing the lens positions and mirror positions to be adjusted for the desired longitudinal chromatic aberration.

In the table above, specific values are indicated for $\Delta s$. In FIG. 5, the dependency of the longitudinal chromatic aberration characteristic on the distances D1, D2 and D3 is depicted in such a way that the value for a02 is indicated along the abscissa and the quantity of the corresponding distance is indicated in mm along the ordinate. Longitudinal chromatic aberration characteristics, not shown here but corresponding in quality to those shown in FIG. 3, are assigned to each individual value of the parameter a02. Accordingly, the distances D1-D3 to be adjusted can be gathered from FIG. 5 depending on the desired longitudinal chromatic aberration characteristic. The corresponding distances are indicated in the table above for values a02 of −3.5, 3.5 and 0.

The color module 9 can be designed for focal lengths f which satisfy the following inequality: 0.002<1/f<0.1. The Abbe numbers of the lenses 20 and 21 are preferably less than 60, preferably less than 40. The collimator 1 from FIG. 4 has a lens 20 of negative refractive power and a low Abbe number, a lens 21 of positive refractive power and a low Abbe number and a mirror 23 of positive refractive power. By adjusting the distances D1-D3, the desired longitudinal chromatic aberration characteristic can be adjusted and changed, while the focal length of the entire system remains constant.

In particular, the color module 9 from FIG. 4 can still comprise adjusting elements for lenses 20 and 21 and mirror 23 so that the longitudinal chromatic aberration characteristic can be changed automatically.

Figure 6:
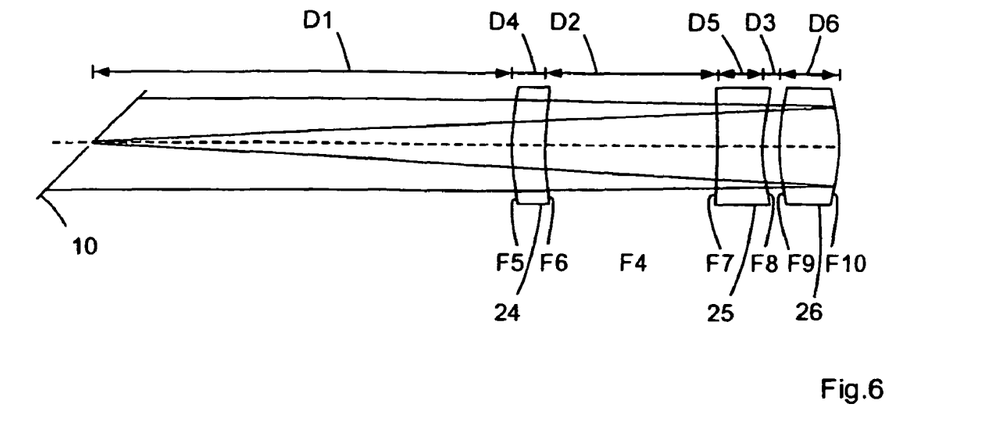
FIG. 6 shows a color module 9 according to another embodiment form.

FIG. 6 shows a color module 9 which has a lens 24 with positive refractive power, a lens 25 of negative refractive power and a mirror lens 26 (surface F10 is silvered) with positive refractive power. Each of the lenses has a low Abbe number, for example, less than 60, preferably less than 40. In the specific embodiment example described herein, the Abbe number is 36.16. Also, the color module 9 in FIG. 6 is designed in such a way that the longitudinal chromatic aberration can be continuously tuned while the focal length of the overall system remains constant. The distance from the entrance pupil to the surface F5 of the lens 24 is D1, the distance of the facing surfaces F6 and F7 of the lenses 24 and 25 is D2, and the distance of the surfaces F8 and F9 of lenses 25 and 26 is D3. Lenses 24, 25 and 26 have a thickness D4, D5 and D6.

The color module 9 from FIG. 6 is designed in such a way that the following conditions are satisfied:

$|1/R6+0.3143/f+0.0088|<0.001;$ $|f1-0.1175*f-45.775|<0.1*f;$ $|f2+0.0133*f+14.621|<0.1*f;$ $|f3-0.0286*f-9.6999|<0.1*f;$ $|D2(\Delta s(=0))-D2(\Delta s(<0))-0.0004*f^2+0.2172*f-1.6243|<0.01*f;$ and $|D2(\Delta s(>0))-D2(\Delta s(<0))-0.0011*f^2+0.4239*f-2.7441|<0.01*f.$ Also, in this embodiment example a value a02 of about −3.5 is achieved for $\Delta s(<0)$ and a value a02 of about 3.5 is achieved for $\Delta s(>0)$. The exact curvatures of the lens surfaces are:
radius of curvature of the convex surface F5: 71.76 mm;
radius of curvature of the concave surface F6: 51.07 mm;
radius of curvature of the concave surface F7: 8.90 mm;
radius of curvature of the concave surface F8: 254.88 mm;
radius of curvature of the convex surface F9: 49.08 mm;
radius of curvature of the convex surface F10: 40.94 mm;
D4=2.00;
D5=5.52; and
D6=4.00.

|    | $\Delta s(<0)$ | $\Delta s(=0)$ | $\Delta s(>0)$ |
|----|------|------|-------|
| D1 | 4.50 | 8.91 | 12.95 |
| D2 | 5.51 | 3.10 | 0.61  |
| D3 | 2.22 | 1.51 | 0.88  |

Figure 7:
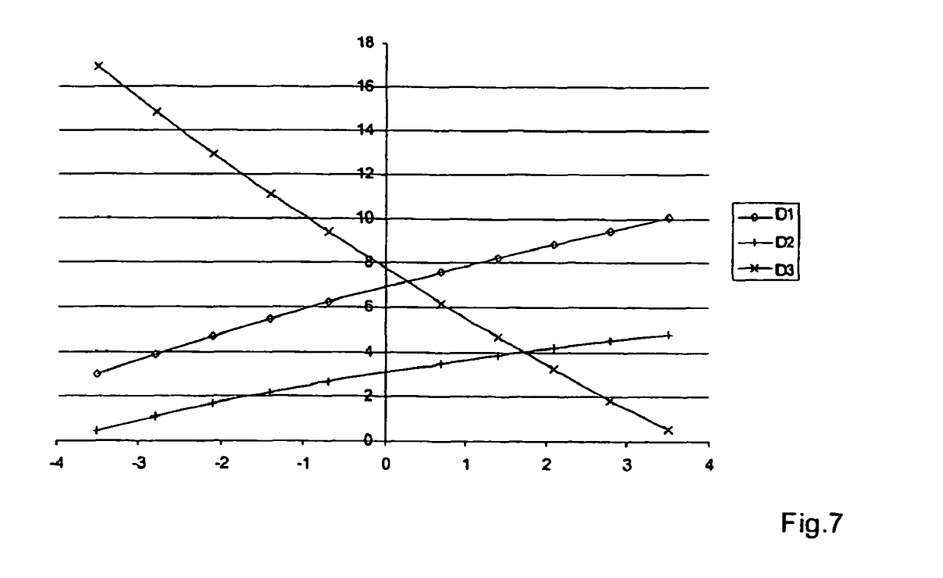
FIG. 7 is a graph showing the lens position and mirror positions of the color module from FIG. 6 which are to be adjusted depending on the desired longitudinal chromatic aberration characteristic.

The dependency of the longitudinal chromatic aberration characteristic on the individual distances D1-D3 is shown in the graph of FIG. 7 which corresponds to that of FIG. 5. The distances D1-D3 can be determined for a desired longitudinal chromatic aberration a02 based on the view in FIG. 7.

In the embodiment forms described herein, it is especially advantageous that all of the curved lens surfaces and mirror surfaces can be formed as spherical surfaces.

The conditions indicated for the embodiment forms of FIGS. 4 and 6 can be derived by a person skilled in the art through numerical analysis of calculations of the optical characteristics of the respective color module 9.

In the embodiment forms described above, the color module 9 is always arranged between the main splitter 8 and the confocal plane or through-opening 15 and therefore only in the detection channel of the laser scanning microscope.

But the color module 9 can also be arranged between the main splitter 8 and the scanner 5. In this case, it serves not only in detection for the confocal imaging of different wavelengths from different object intersection lengths, but even in illumination for wavelength-dependent splitting of the laser radiation with a plurality of wavelengths, so that the corresponding wavelength is also imaged and focused only in the corresponding object intersection length. A construction of this kind is shown in FIG. 8, wherein elements identical to those in FIG. 1 are designated by the same reference numbers and reference is had to the comments above with regard to their description.

Figure 8:
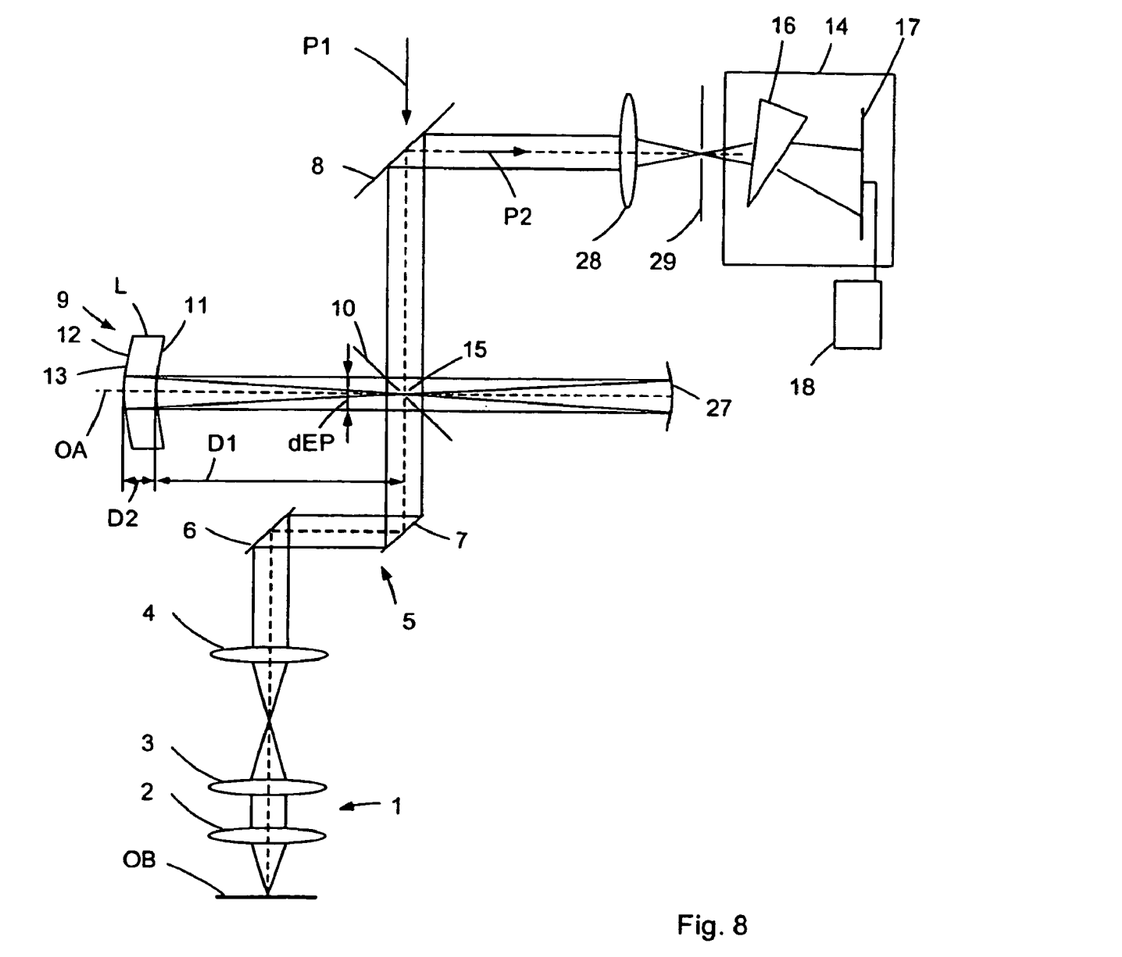
FIG. 8 is a schematic view of another embodiment form of the microscope according to the invention.

In contrast to the embodiment form of FIG. 1, the deflection mirror 10 is arranged between the scanner 5 and the main splitter 8 and is silvered on both sides in the construction shown in FIG. 8. Further, a collimator 27 is provided which can be constructed, for example, as a mirror, rear-surface mirror on a lens or as refractive optics.

During operation, laser radiation with different wavelengths is guided to the deflection mirror 10 by the main splitter 8 (as is indicated by the arrow P1) as a parallel beam bundle and is reflected by the deflection mirror 10 (referring to FIG. 8) towards the right to the collimator 27. The collimator 27 focuses the parallel bundle in such a way that it passes through the through-hole 15 in the deflection mirror 10 and then impinges on the individual lens L as a diverging beam bundle. The individual lens L reflects the diverging beam bundle as a parallel beam bundle toward the deflection mirror 10 and simultaneously applies the adjusted longitudinal chromatic aberration to it. This parallel bundle with adjusted longitudinal chromatic aberration is then reflected from the deflection mirror 10 to the scanner 5 and is focused on or in the object OB to be examined and is moved over the object OB by means of the scanner 5, scanner optics 4 and microscope optics 1. The different wavelengths are focused in the different object intersection lengths based on the impressed longitudinal chromatic aberration by means of the individual lens.

Owing to the interaction between the focused laser radiation and the object, the generated sample radiation passes through the microscope optics 1, the scanner optics 4 and the scanner 5 and then impinges on the deflection mirror 10 as a parallel beam bundle and is reflected from the latter to the individual lens L. The individual lens L reflects the parallel sample beam bundle back to the deflection mirror 10 as a converging sample beam bundle, wherein always only the corresponding wavelength is focused in the through-hole 15 because of the longitudinal chromatic aberration of the individual lens L from every object intersection length, so that the focused sample beam bundle is free from chromatic aberration after passing through the through-hole 15. This sample beam bundle is reflected at the collimator 27 and transformed into a parallel beam bundle and is then reflected to the detection unit 14 by the deflection mirror 10 and the main splitter 8. Detection optics 28 and a confocal diaphragm 29 are arranged between the detection unit 14 and the main splitter 8, wherein the detection optics 28 focus the parallel bundle into the through-opening of the confocal diaphragm 29 so as to be free from chromatic errors. The detection unit 14 then detects the intensity of the confocally imaged sample radiation in a wavelength-dependent manner in the same way as in the embodiment form of FIG. 1.

In a modification of the embodiment form of FIG. 8, the deflection mirror 10 is arranged so as to be rotated by 90° relative to its current position so that the laser radiation for illumination which impinges on the deflection mirror 10 through the main splitter 8 as a parallel bundle is first reflected to the individual lens L, is reflected back by the latter as a converging beam bundle, passes through the through-hole 15, is reflected at the collimator 27 and directed to the deflection mirror 10 as a parallel beam bundle, and is then reflected by the latter toward the scanner 5. In the same way, the sample radiation passes through the described beam path in the reverse sequence so that the sample radiation coming from the scanner 5 is reflected at the deflection mirror 10 to the collimator 27 as a parallel bundle, is reflected by the latter to the deflection mirror 10 as a converging sample beam bundle which passes through the through-hole 15 and is reflected at the individual lens L, is color-corrected and is reflected as a parallel bundle back to the deflection mirror 10 which reflects the parallel bundle upward (referring to FIG. 8) to the main splitter 8. In this arrangement, a collimator 27 is preferably used which has no chromatic aberration and which accordingly is either corrected particularly well for the corresponding wavelengths or, for example, comprises only one mirror element.

Further, it is possible in the embodiment form of FIG. 1 to arrange a color module corresponding to the color module 9 in front of the main splitter 8 for illumination so that the wavelength-dependent splitting of the laser radiation with the different wavelength is carried out already before the main splitter 8. In this case, the longitudinal chromatic aberrations in both color modules are preferably identically adjusted.

In addition to the possibilities for confocal illumination which have already been described, it is also possible to illuminate the object OB in incident light or transmitted light and to use the microscope in the described manner only on the detection side.

In the embodiment forms described above, the sample radiation at the main splitter 8 is always reflected, while the laser radiation for illumination is transmitted. Of course, the microscope can also be constructed in such a way that the sample radiation is transmitted at the main splitter and the laser radiation for illumination is reflected at the main splitter.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A microscope for measuring the surface profile of an object, comprising:
    an illumination module which directs illumination radiation with different wavelengths to different surface portions of the object in such a way that a predetermined object intersection length range is illuminated for every portion; and
    a detection module which detects sample radiation of every portion successively in time, wherein the sample radiation is generated based on an interaction between the illumination beam and the object;
    wherein the detection module (1) directs the sample radiation into a detection beam path by means of a scanner, and confocally images another wavelength of the sample radiation directed into the detection beam path in a plane for every intersection length of the object intersection length range to be detected, and (2) detects the intensity of the confocally imaged sample radiation in a wavelength-dependent manner and derives therefrom the position of the corresponding surface portion of the object; and
    wherein the detection module has a color module with adjustable longitudinal chromatic aberration which is arranged between the scanner and the plane, and through which the sample radiation passes so that the intersection lengths to be detected are adjustable by changing the longitudinal chromatic aberration.

2. The microscope according to claim 1;
    wherein the sample radiation strikes the color module as a diverging or parallel beam bundle and is then transformed by the color module into a parallel or converging beam bundle.

3. The microscope according to claim 1;
    wherein the color module has at least one lens and a curved mirror (13) which folds the detection beam path in such a way that the sample radiation passes through the lens twice.

4. The microscope according to claim 3;
    wherein the mirror is constructed as a rear-surface mirror on one side of the lens.

5. The microscope according to claim 3;
    wherein the color module has the lens as an individual lens and the mirror as an individual mirror.

6. The microscope according to claim 3;
    wherein both sides of the lens are formed as spherical surfaces.

7. The microscope according to claim 3;
    wherein the sample radiation impinges on the color module in such a way that the principal ray of the sample radiation coincides with the optical axis of the color module.

8. The microscope according to claim 3;
    wherein a deflection mirror with a through-hole is arranged in front of the color module in the detection beam path; and
    wherein the sample radiation passes through the through-hole as a diverging beam bundle, impinges on the color module and, coming from the color module as a parallel bundle, is deflected at the deflection mirror.

9. The microscope according to claim 3;
    wherein a deflection mirror is arranged in front of the color module in the detection beam path; and
    wherein the sample radiation is deflected to the color module by the deflection mirror as a parallel beam bundle, passes through the color module and, coming from the color module as a converging beam bundle, passes through the through-hole.

10. The microscope according to claim 9;
wherein a collimator is arranged downstream of the deflection mirror, and deflects the sample beam bundle passing through the through-hole to the deflection mirror as a parallel bundle; and
wherein the deflection mirror is silvered on both of its sides, and reflects the parallel bundle to the next optical element in the detection beam path.

11. The microscope according to claim 1;
wherein a main splitter is arranged in the detection beam path, by means of which main splitter the illumination beam is guided to the object and the sample radiation is guided in the detection beam path, the color module being arranged between the main splitter and the plane.

12. The microscope according to claim 1;
wherein a main splitter is arranged in the detection beam path, by means of which main splitter the illumination beam is guided to the object and the sample radiation is guided in the detection beam path, the color module being arranged between the main splitter and the scanner.

13. The microscope according to claim 1;
wherein the color module has first and second exchangeable color optics with different longitudinal chromatic aberrations so that the longitudinal chromatic aberration can be changed by exchanging the color optics.

14. The microscope according to claim 1;
wherein the color module comprises the mirror and two or three lenses, and the lenses and the mirror are displaceable along the optical axis of the color module so that the desired longitudinal chromatic aberration of the color module can be adjusted.

15. The microscope according to claim 14;
wherein all of the lenses are produced from the same material.

16. The microscope according to claim 1;
wherein the illumination module carries out a confocal illumination, incident brightfield illumination or transmitted brightfield illumination of the object.

17. A microscopy method for measuring the surface profile of an object, the method comprising the steps of:
directing an illumination beam with different wavelengths onto different surface portions of the object in such a way that a predetermined object intersection length range is illuminated for every portion and, as a result of an interaction between the illumination beam and the object, sample radiation for each portion is generated, and
detecting the sample radiation of every portion successively in time;
wherein the sample radiation is directed into a detection beam path by means of a scanner, and another wavelength of the sample radiation directed into the detection beam path is imaged confocally in a plane for every intersection length of the object intersection length range to be detected;
wherein the intensity of the confocally imaged sample radiation is detected in a wavelength-dependent manner and the position of the corresponding portion of the object is derived from the latter; and
wherein a color module with adjustable longitudinal chromatic aberration is arranged between the scanner and the plane, and is traversed by the sample radiation so that the intersection lengths to be detected can be adjusted by changing the longitudinal chromatic aberration.

* * * * *

UNITED STATES PATENT AND TRADEMARK OFFICE
CERTIFICATE OF CORRECTION

PATENT NO. : 7,715,021 B2 Page 1 of 1
APPLICATION NO. : 12/226634
DATED : May 11, 2010
INVENTOR(S) : Johannes Winterot It is certified that error appears in the above-identified patent and that said Letters Patent is hereby corrected as shown below:

On the Cover Page:

Item (73), please correct the Assignee from "Carl Zeiss Microimaging GmbH" to --Carl Zeiss MicroImaging GmbH--.

Signed and Sealed this

Twenty-seventh Day of July, 2010

David J. Kappos
*Director of the United States Patent and Trademark Office*